(12) United States Patent
Pfister et al.

(10) Patent No.: US 7,756,356 B2
(45) Date of Patent: Jul. 13, 2010

(54) SYSTEM AND METHOD FOR FACTORIZING LIGHT IN A SEQUENCE OF IMAGES

(75) Inventors: Hanspeter Pfister, Arlington, MA (US); Wojciech Matusik, Lexington, MA (US); Kalyan Sunkavalli, Cambridge, MA (US); Szymon M. Rusinkiewicz, Princeton, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 796 days.

(21) Appl. No.: 11/683,833

(22) Filed: Mar. 8, 2007

(65) Prior Publication Data

US 2008/0218516 A1 Sep. 11, 2008

(51) Int. Cl.
*G06K 9/36* (2006.01)

(52) U.S. Cl. ........................................ 382/276; 382/174
(58) Field of Classification Search ................. 345/612; 382/174, 276
See application file for complete search history.

(56) References Cited

U.S. PATENT DOCUMENTS 6,470,094 B1 * 10/2002 Lienhart et al. ............. 382/176
6,717,698 B1 * 4/2004 Lee ............................ 358/1.9

* cited by examiner

*Primary Examiner*—Matthew C Bella
*Assistant Examiner*—Gregory F Cunningham
(74) *Attorney, Agent, or Firm*—Dirk Brinkman; Gene Vinokur (57) ABSTRACT

A method factorizing a sequence of images acquired of a scene into lighting components. The scene is illuminated by a moving light source. An appearance profile is constructed for each pixel in the sequence of images. The appearance profile is a vector representing intensities of the pixel at instances in time. The appearance profiles are factorized into a shadow component, a skylight component, and a sunlight component.

15 Claims, 8 Drawing Sheets

Fig. 11C

SYSTEM AND METHOD FOR FACTORIZING LIGHT IN A SEQUENCE OF IMAGES

FIELD OF THE INVENTION

This invention relates generally to image processing, and more particularly to factorizing a light field observed a sequence of images into meaningful, lower-dimensional components that completely describe the scene.

BACKGROUND OF THE INVENTION

Light Field Factorization

Factorization is a process for decomposing data into meaningful components, or factors. One kind of data related to this invention are light fields, which describe the transport of light throughout a scene. A number of light field factorization methods are known, see U.S. Pat. No. 7,062,419 to Grzeszczuk, et al, issued Jun. 13, 2006, "Surface light field decomposition using non-negative factorization," and U.S. Patent Application 20040249615, Grzeszczuk et al. published Dec. 9, 2004, "Surface light field decomposition using non-negative factorization." Those methods use approximate graphical representations of objects, instead of images of real world scenes.

One factorization, method decomposes complex surface reflectance functions (spatially varying BRDFs) into a sum of products of lower dimensional (1D or 2D) components, Lawrence et al., "Inverse Shade Trees for Non-Parametric Material Representation and Editing," ACM. Trans. on Graphics (also Proc. of ACM SIGGRAPH) (July) 2006 incorporated herein by reference. A similar method decomposes a time-varying surface appearance into a low dimensional representation that is space-time dependent, Gu et al., "Time-varying Surface Appearance: Acquisition, Modeling, and Rendering. ACM Trans, on Graphics, 2006. Both of those methods accomplish similar goals. They factorize large datasets of complex surface reflectance into terms that are compact, and at the same time, physically meaningful and editable. Because they acquire and model the full eight-dimensional BRDF, they can render under any viewing, lighting, and in the case of Gu et al, temporal condition. The primary goal of their work is to compute shade trees in computer graphic applications. However, the complexity of the BRDF acquisition makes those methods impractical for complex, outdoor scenes.

Inverse rendering measures attributes, such as lighting, textures, and the BRDF from images. Most prior art focuses on small objects and indoor scenes. One method recovers photometric properties from images of buildings, Debevec et al., "Estimating Surface Reflectance Properties of a Complex Scene under Captured Natural Illumination, USC ICT Technical Report ICT-TR-06.2004, 2004. They are able to relight and generate photo-realistic images from arbitrary viewpoints. However, their methods require measurements of the incident illumination and surface materials and a 3D model of the scene geometry. That makes the method impractical for outdoor scenes.

Another method separates the light field in a scene into direct and global components using controlled lighting, Nayar et ah, "Fast Separation of Direct and Global Components of a Scene using High Frequency Illumination," ACM Trans. on Graphics, 2006. Obviously, it is impossible to control the lighting in outdoor scenes.

Therefore, it is desired to factor a sequence of images acquired of complex indoor or outdoor scenes into meaningful components that completely describe the scene.

Time-Lapse Photography

In time-lapse photography, a sequence of images (video) is acquired at a slow rate, and rendered at a high rate. Thus, time seems to lapse faster. Conventional time-lapse photography is often used for outdoor scenes, e.g., tidal flows, blooming flowers, and weather and traffic patterns. Time-lapse photography is also frequently used in surveillance applications.

Time-lapse photography can generate a large amount of data. For example, a single camera that takes an image every five seconds produces 17,280 images per day, or close to a million images per year. Image compression can reduce the storage requirements, but the reconstructed images typically suffer from annoying artifacts and are not very useful for further image analysis. In addition, it is difficult to edit the images in a time-lapse sequence, and advanced image-based rendering operations, such as relighting are impossible.

Therefore, a key challenge in dealing with time-lapse videos is to provide a representation that efficiently reduces storage requirements while allowing advanced image editing and useful image analysis.

One method uses intrinsic images to represent intrinsic characteristics of a scene, such as illumination, reflectance, and surface geometry, Barrow et al., "Recovering intrinsic scene characteristics from images," Academic Press, 1978. Another method uses a maximum-likelihood framework to estimate a single reflectance image and multiple illumination images from time-lapse video, Weiss, "Deriving Intrinsic Images from Image Sequences," IEEE International Conference on Computer Vision (ICCV), II: 68-75, 2001. That method was extended to derive time-varying reflectance and illumination images from a surveillance video, Matsushita et al., "Illumination normalization with time-dependent intrinsic images for video surveillance," CVPR, IEEE Computer Society, 3-10, 2003.

Another method use time-lapse images to determine a reflectance field of a scene for a fixed viewpoint, Matusik et al, "Progressively-Refined Reflectance Functions from Natural Illumination," Eurographics Symposium on Rendering, Keller et al., Eds., 299-308, 2004. They represent images as a product of the reflectance field and incident illumination. However, that method requires estimating the incident illumination using an additional light probe camera. The estimated reflectance field light combines the effects of reflectance and shadows. That method is only suitable for studio settings and not outdoor scenes.

Another method acquires image sequences with a randomly moving light source to cluster the image into regions that have similar normals, Koppal et al., "Appearance Clustering: A Novel Approach to Scene Analysis," IEEE Conference on Computer Vision and Pattern Recognition (CVPR), 2006, incorporated herein by reference. The normal clusters can be used for a variety of computer vision applications, including the decomposition of the image into the terms of a linearly separable bidirectional reflectance distribution function BRDF.

SUMMARY OF THE INVENTION

The embodiments of the invention provide a method for factorizing a sequence of images (video) into shadow, sunlight, and skylight components. The factorization enables a user to relight a scene, recover a portion of the scene geometry, e.g., the surface normals, and to perform image editing applications.

In one embodiment of the invention, the images are acquired of outdoor scenes using time-lapse photography. The camera is fixed, and the scene is mostly stationary. The scene can be illuminated by sunlight or moonlight. In this case, the scene will include lighting patterns, including shadows, which slowly evolve over time as the earth rotates.

The method locates onsets of the shadows using a profile of intensities for each pixel in the images, which varies over time. The profiles are called appearance profiles. There is one time evolving appearance profile for each pixel.

The method factors the appearance profiles into shadow, sunlight and skylight components.

The sequence of images form a spatio-temporal volume of pixels. The volumes are analyzed using matrix factorization to obtain two sets of basis matrices representing variation of pixel intensities over time, together with per pixel offsets, and intensity scaling of the basis matrices that represent spatial variation. The resulting representation is compact, and compresses the entire sequence of images, be it for a day or a year or more, into three images, two sets of basis matrices, and a compressed representation for shadows.

Reconstructions and rendering from these compressed data representation show better error characteristics than conventional compression methods. The representations can be edited by a user to re-render the scene, or to modify illumination, reflectance, shadow and geometric properties in the scene. The shadows can be discarded or retained, depending on the application. Other outliers, such as moving pedestrians or vehicles can be handled explicitly or implicitly.

The embodiments of the invention can also be used for a variety of computer vision applications, such as background modeling, image segmentation, and scene reconstruction. Other applications for the invention include shadow removal, advanced image editing, and pictorial rendering.

BRIEF DESCRIPTION OF THE DRAWINGS

The novel features characteristics of the invention are set forth in the appended claims. The present invention is illustrated by way of example, and not by way of limitation, in the Figures of the accompanying drawings and in which like reference numerals refer to similar elements. The invention itself, however, as well as a preferred mode of use, is best be understood by reference to the following detailed description of illustrative embodiments when read in conjunction with the accompanying drawings:

DETAILED DESCRIPTION OF THE PREFERRED EMBODIMENTS

Figure 1A:
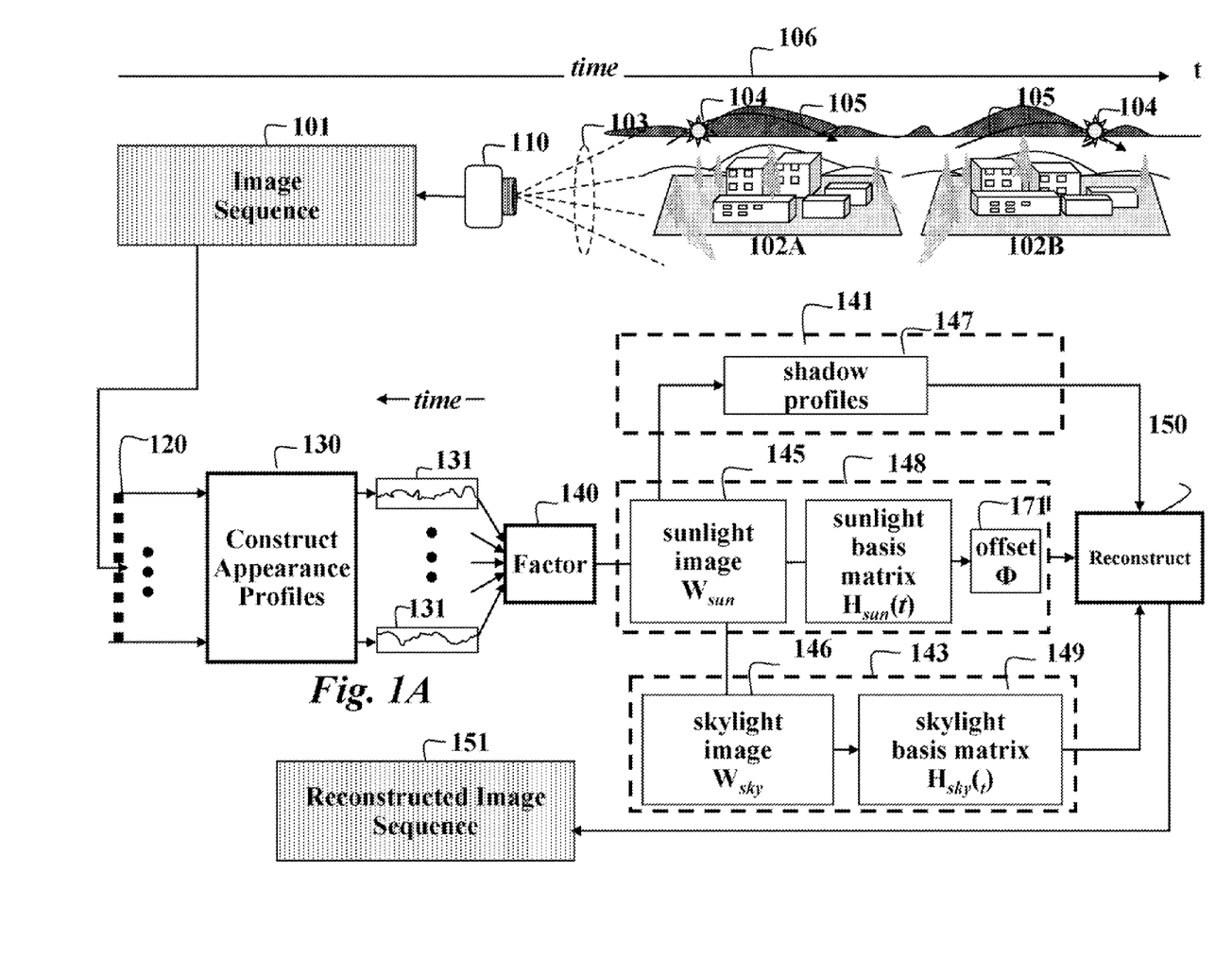
FIG. 1A is a flow diagram of a method for factorizing a sequence of images according to an embodiment of the invention.

FIG. 1 shows the basic idea of one embodiment of our invention. A camera 110 acquires a sequence of images (frames) 101 of a scene 102. The scene 102 is primarily illuminated by a moving source 104 of direct light. The dotted lines represent viewing rays 103. In a preferred embodiment, the image sequence 101 is a time-lapse video of an outdoor scene 102A-102B. Note the reversal of the shadows in the scene over time t. However, it should be understood that the invention can also be worked with non-time-lapse videos, and indoor scenes that have some form of movable direct lighting.

Lighting Factors

In real world scenes, the various factors that contribute to the light observed by a camera are numerous and complex. There can be direct illumination, which, can include sunlight, moonlight, or one or more artificial sources of light. Indirect illumination includes all other light, such as skylight and direct light transported to the camera by other means. The effects of indirect illumination are mostly visible in shadows, e.g., the shadows cast by a building. Reflectance is the amount of incoming light that is reflected by a surface. Reflectance usually depends on the incoming light and the outgoing view directions. If the view direction is fixed, the reflectance only depends on the incoming light.

To simplify this description, we factor a light field observed by a camera into sunlight and skylight, and shadow components. Therefore, without loss of generality, we use the terms sunlight image, sunlight basis matrix, sunlight profiles, skylight image, skylight basis matrix, skylight profiles, shadow image and shadow profile to explain the factors. It should be understood that the same terms can be used for indoor scenes, where the light source or sources are natural and/or artificial, for example, the 'sunlight' is a moving spotlight, and 'skylight' is ambient lighting.

Appearance Profiles

Figure 1B:
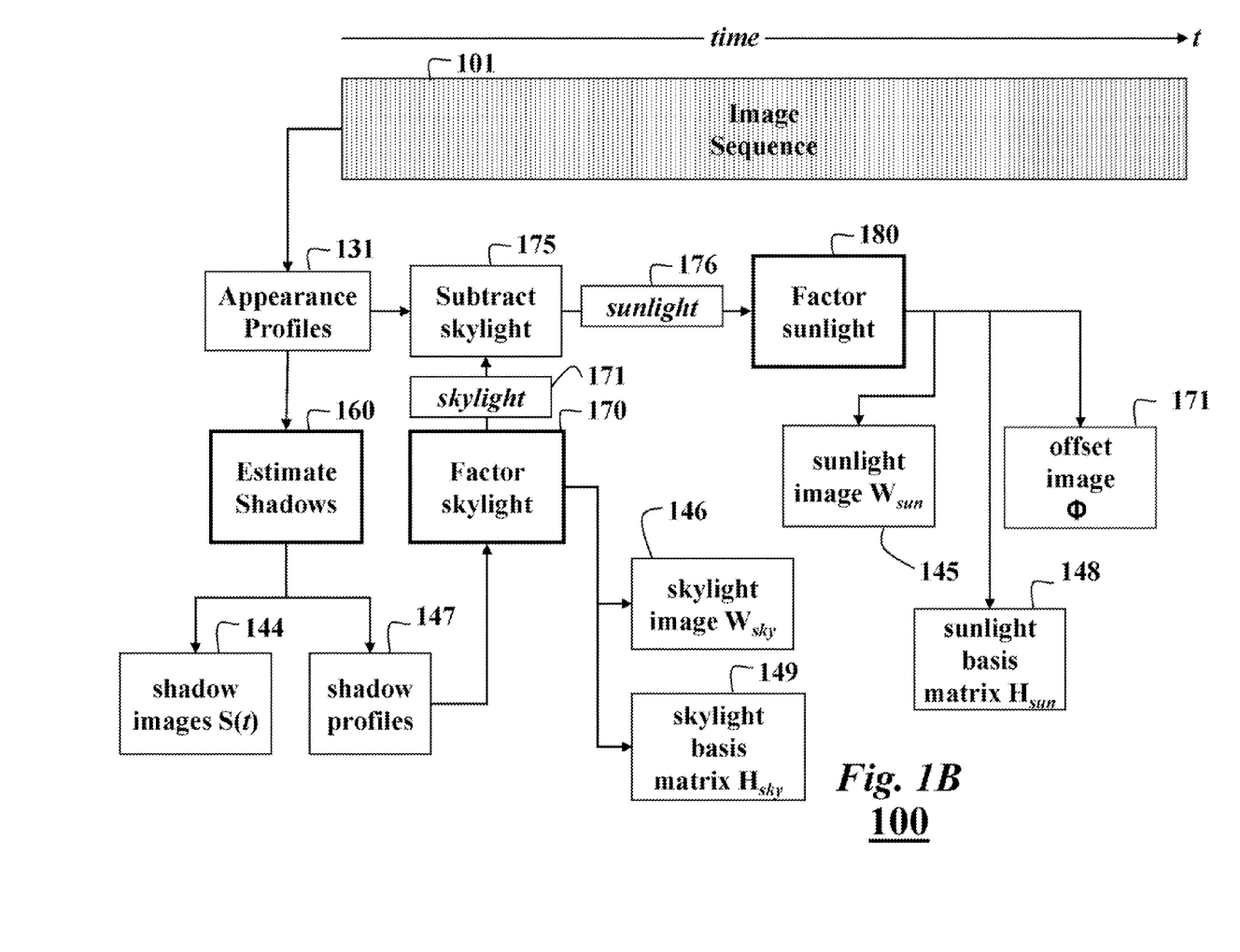
FIG. 1B is a detailed flow diagram of the method of FIG. 1A.

For each unique (x,y) location of a pixel P in the sequence of images 101, an appearance profile 131 is constructed 130. The appearance profile represents a time evolving appearance of the scene at that pixel. For example, if the image has 1000×1000 pixels, then there are a million appearance profiles. There is one intensity value for each image or frame in each profile. The appearance profiles are factored 140 to produce shadow 141, sunlight 148, and skylight components 143 representative of the time evolving appearance of the scene 102. The components 141-143 can be uses to reconstruct 150 a reconstructed image sequence 151 or novel video.

Shadow Component

The shadow component 141 includes a shadow profile for each pixel. Each shadow profile has a bit for each frame, i.e., instance in time. The bit is zero if the pixel is a shadow at that particular time, and one otherwise. Thus, the shadow profiles are a highly compressed binary representation of time evolving shadow patterns, primarily due to the moving 105 light source 104.

Sunlight Component

The sunlight component 142 includes a sunlight image 145 in a form of weights $W_{sun}$. Thus, a single image is used to represent the appearance of the scene 102 due to direct sunlight over the entire time span of the sequence 101. A sunlight basis matrix $H_{sun}(t)$ is for spatial scaling, and an offset image Φ 171 provides temporal scaling, where $H_{sun}$ is temporal curve, $W_{sun}$ is spatial scaling and Φ are temporal offsets.

Skylight Component

The skylight component 143 includes a single skylight image $W_{sky}$ 146, and a skylight basis matrix $H_{sky}(t)$ 149.

Details

As shown in FIG. 1B, the embodiments of our invention provide a method 100 for factoring the sequence of images 101, i.e., a video, acquired of the scene 102 overtime 106 into the shadow, sunlight, and skylight components 141-143. Our goal is to decompose the spatio-temporal-time volume of the time-lapse image sequence 101 images so as to enable us to analyze and edit the video, and generate a novel video, e.g., a scene without shadow as shown in FIG. 11B or a scene with different skylight as shown in FIG. 11C.

Therefore, we estimate 160 shadow, factor skylight 170, skylight 171. We subtract 175 the skylight 171 to obtain the sunlight 176, and factor 180 the sunlight 176.

Image Formation

Figure 4:
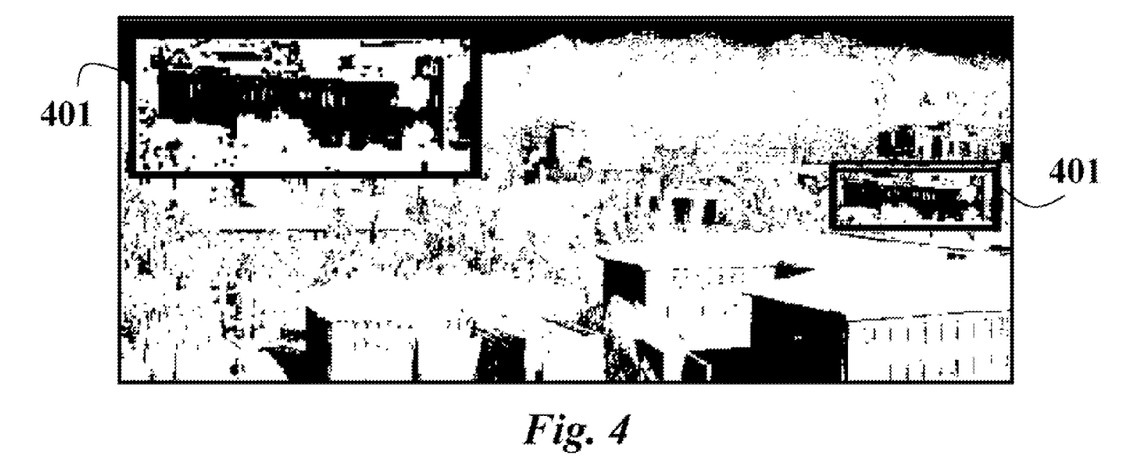
FIG. 4 is a binary shadow image according to an embodiment of the invention.
Figure 5:
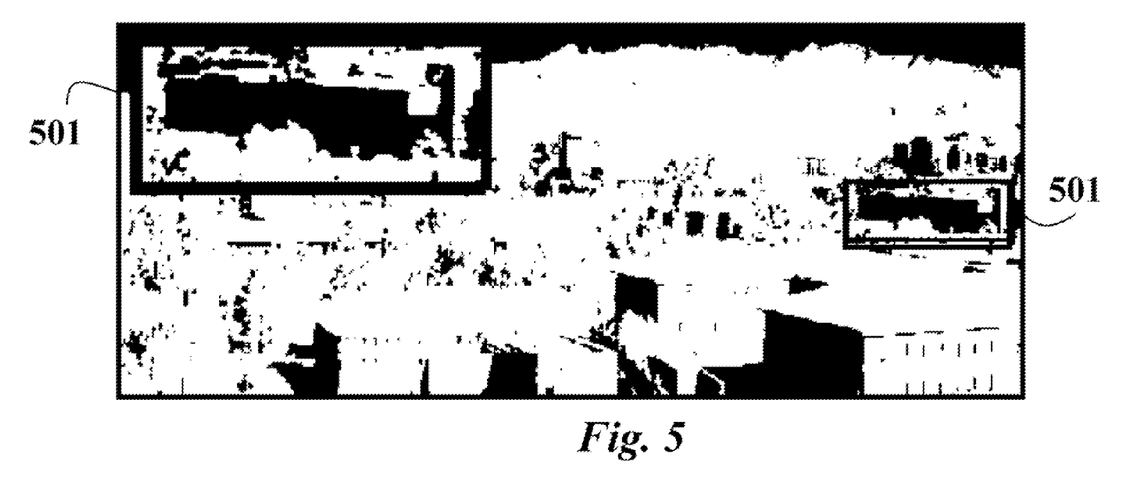
FIG. 5 is a final shadow image after edge-preserving bilateral filtering according to an embodiment of the invention.

The process of image formation for an image or frame $F(t)$ the sequence 101 can be represented by $$F(t)=T(t)L(t), \quad (1)$$

where T is a light field transport matrix field, and L is a viewing ray 103, i.e., L is moving 105 light 104. Each pixel $F^i(t)$ 120 in the frame F stores an intensity value along the viewing ray in some direction. The matrix T completely describes the transport of energy from light to viewing rays, including shadowing, absorption, reflection, translucence and scattering effects. Be factoring the transport matrix T into the shadow component 141 and the skylight component 146, we obtain $$F(t)=(R(t)*S(t)L(t), \quad (2)$$

where '*' denotes an element-by-element multiplication, S represents a shadow image 144, and R is a skylight image. A pixel in the shadow image S has a value of zero to indicate the presence of shadows at that pixel and time instance, otherwise the pixel is one. That is the shadow image is a binary image, see FIGS. 4-5. The skylight image $R(t)$ 149 varies with time 106 because the skylight image includes the effects of inter-reflections and light scattering in the scene 102 illuminated by the moving light source 104.

We can approximate the incident lighting in the scene as a sum of an ambient term $L_{sky}(t)$ due mostly to atmospheric scattering, and a single-directional $L_{sun}(t)$, corresponding to the sunlight (or moonlight) 104.

$$F(t)=(R(t)*S_{sky}(t))L_{sky}(t)+(R(t)*S_{sun}(t)L_{sun}(t). \quad (3)$$

This approximation neglects sources of artificial lighting in the scene, such as streetlights and spotlights. Because the separation of sunlight and reflectance under diffuse lighting is ill-posed, we collapse the first term according to $$F(t)=I_{sky}(t)+(R(t)*S_{sun}(t)L_{sun}(t)=I_{sky}(t)+I_{sun}(t) \quad (4)$$

Remarkably and in contrast with the prior art, we estimate $I_{sky}(t)$, $S_{sun}(t)$, and $R(t)$ from the sequence of frames $F(t)$ 120 without knowledge of the geometry of the scene, material properties of surfaces in the scene, direction and intensity of the incident lighting, and camera calibration.

We estimate $I_{sky}(t)$ from pixels that are in shadow, whereas directly illuminated pixels include $I_{sky}(t)+ I_{sun}(t)$.

Shadow Estimation

Figure 2:
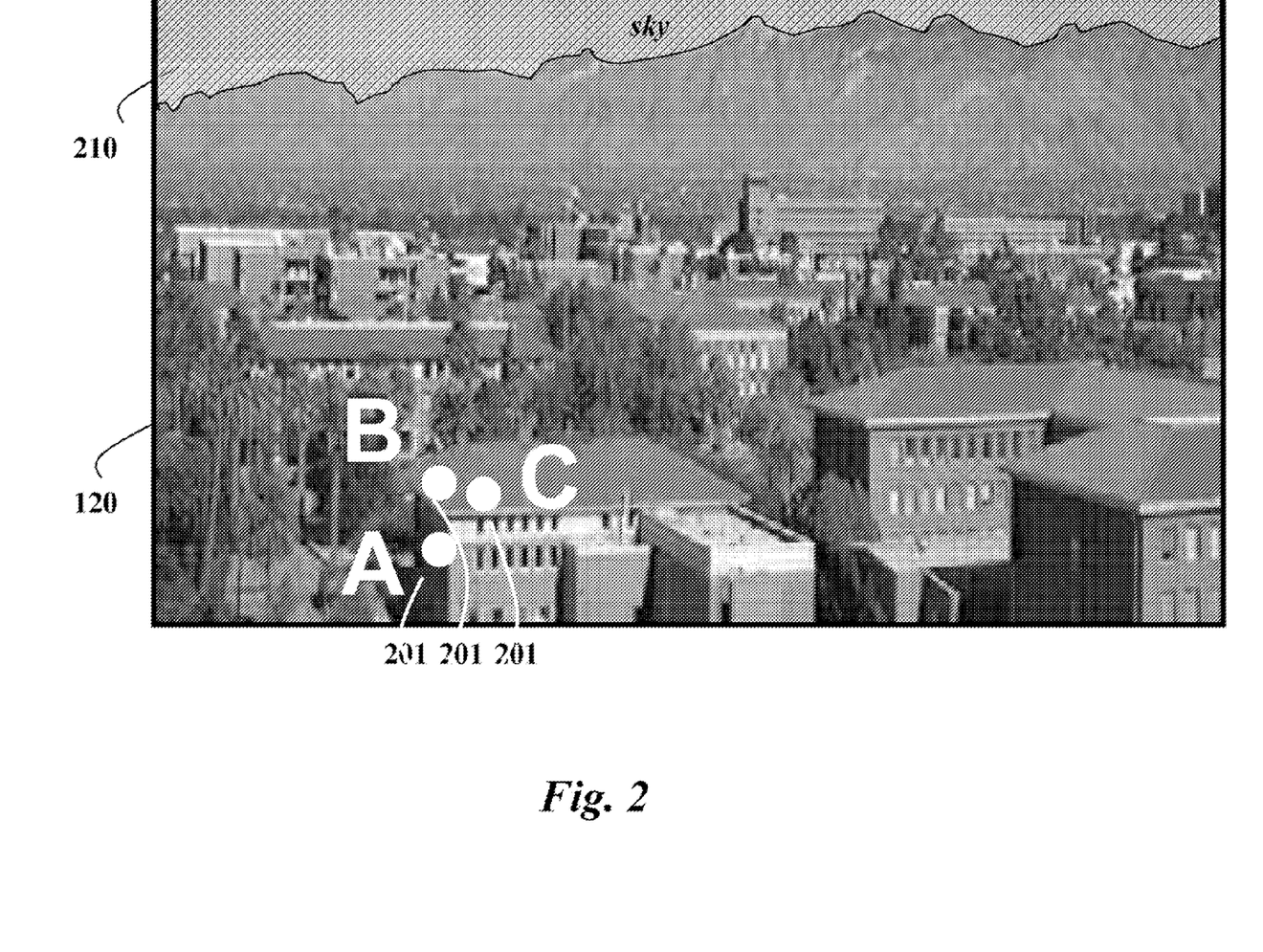
FIG. 2 is an example image processed by the method of FIGS. 1A-1B.

FIG. 2 shows one frame 120 of the image sequence 101. We use this frame and pixels (not to scale) A 201, B 202, and C 203 throughout this description. The method described herein is performed independently and identically on all three RGB color channels.

We assume that the intensity of the pixels 120 is due to direct illumination and reflection from surfaces in the scene. Therefore, portions of the image that show the sky 210 are segmented out. Later we can composite the sky portion back into reconstructed images 151. This has the added benefit that we preserve moving clouds, which can be an important visual component in time-lapse videos.

Figure 3:
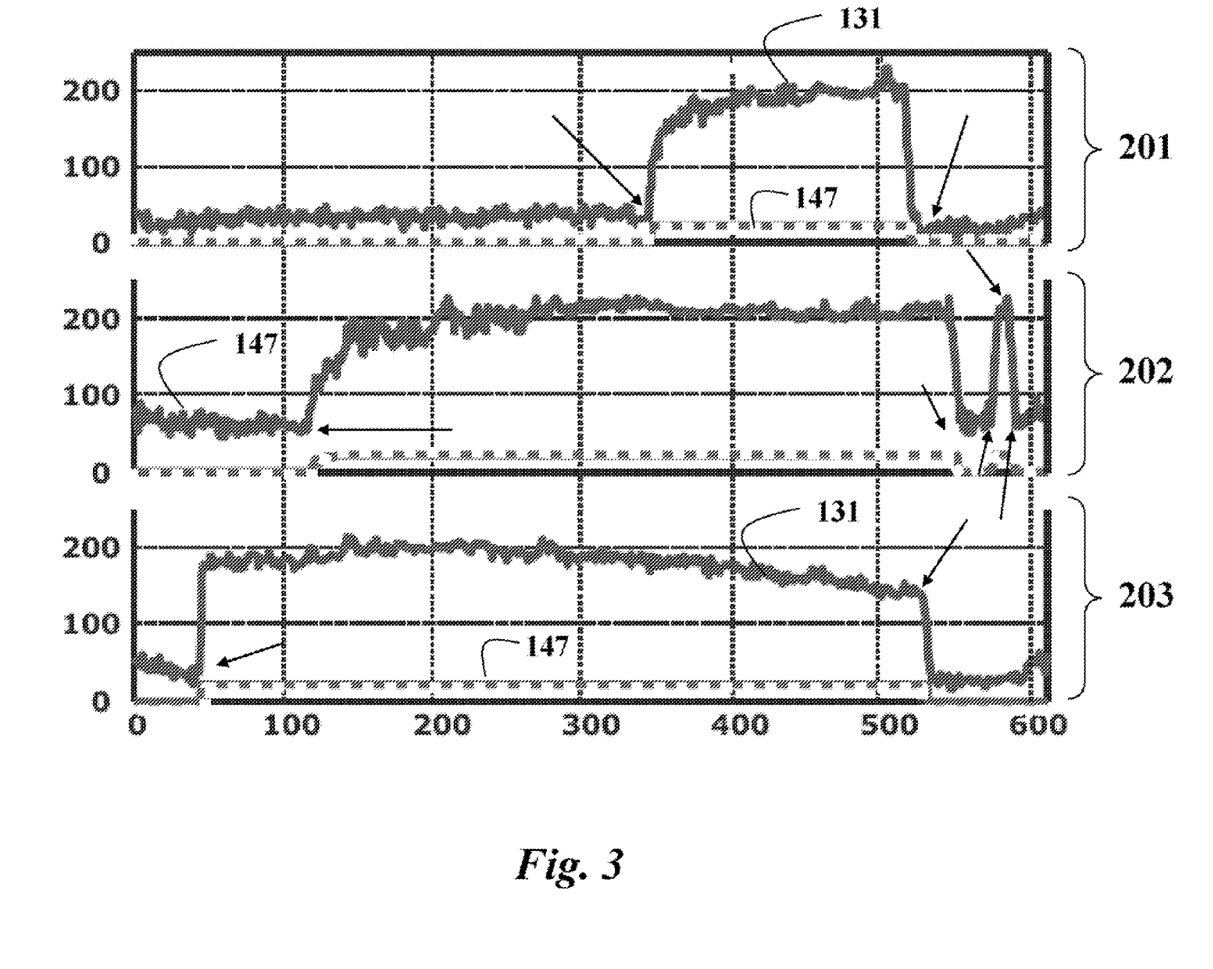
FIG. 3 is a schematic of appearance profiles according to an embodiment of the invention.

As the sun 104 moves 105 due to rotation of the earth, the observations at the pixels A, B and C in the sequence 101 result in a continuous appearance profile, as shown in FIG. 3. In FIG. 3, the vertical axis indicates the pixel intensity (0-255) for the three pixels 201-203, the horizontal axis time (t) 106 or frame number, the jagged curves 301 the appearance profile 131, and the dotted curves the shadow profile 144. Note the 'intensity' for the shadow profile, as shown, is either zero or 1 to indicate in and out of a shadow.

The appearance profile 131 is a vector of intensities $F_i(t)$ 131 measured at pixel $P_i$ over time 106. It is a complicated function of the illumination, scene geometry, and surface reflectance. The pixel intensities change dramatically when illuminated directly or when the pixels 201-203 are in a shadow. We use drastic variation (discontinuities indicated by arrows) in the appearance profiles 133 to estimate the shadow profiles 147.

First, we determine a median value $m_{min}$ of the n smallest intensities at each pixel location. We typically assume that each pixel is in a shadow some fraction of time, e.g., ⅕, so n is 20% of the total number of frames in the sequence. If $F_i(t)$ greater than a threshold $km_{min}$, then we set the shadow profile $S_i(t)$ 147 to 'one' for each frame and to 'zero' otherwise. We find heuristically that k=1.5 works well for most image sequences. Other thresholding techniques can also be used.

FIG. 4 shows a shadow image for frame 275. We call this a binary shadow image, because pixel values are either 0 or 1. It is generally quite noisy due to moving objects e.g., trees, vehicles, or people, and changes in the illumination, e.g., due to clouds. Therefore, to determine the final shadow image $S_{sun}$ 144, we use an edge-preserving bi-lateral filter to produce the final shadow image as shown in FIG. 5. The insets 401 and 501 indicate close ups. We could improve the shadow images by explicitly removing moving objects, either by determining median images for short time intervals in the input sequence, or by using background models and a conventional object segmentation procedure.

Factorization

One idea of our invention is that for an outdoor sequence of images 102 under a mostly clear-sky conditions, the appearance profiles 131 of all pixels in the scene are similar up to an offset along the time axis 106 and a scale factor along the intensity axis. This is an extension of orientation-consistency as described by Hertzmann et al., "Example-Based Photometric Stereo: Shape Reconstruction with General, Varying BRDFs," IEEE Transactions on Pattern Analysis and Machine Intelligence (PAMI) 27, 8 (August), 1254-1264 2005, incorporated herein by reference.

The basic idea is that similarly textured and similarly oriented surfaces reflect light in a similar manner. Hertzmann et al, determine the surface normals of an object that has been imaged together with, a reference objects with a similar shape and similar texture, e.g., spherical and similar BRDF. They use a metric that matches intensity extrema and unsupervised clustering to determine orientation consistencies between scene points of unknown normals and BRDFs. Their method is described for simple objects with similar textures in simple scenes in a studio setting with controlled artificial lighting.

Surprisingly, we estimate surface normals for complex outdoor scenes with unknown shapes, orientations and textures. Our idea is that the moving light source 104 provides different lighting over time. This means that, under the right conditions, two pixels with the same surface orientation have a similar appearance in the images 101. Scene points with different surface normals often exhibit extrema (highlights or specularities) in their appearance profiles at different time instances, irrespective of their material properties, see Koppal et al. above.

Therefore, in contrast with the conventional orientation-consistency method, our method factors the contributions of shadows, skylight, and sunlight. We represent the corresponding appearance profiles 131 as a linear combination of basis matrices that are offset and scaled. Unlike the prior art, we are not able to fit a simple analytic model, such as the Phong illumination model, to our complex scene. Therefore, we use a data-driven process.

This process determines the basis profile 1000. There is one basis profile 148 for sunlight, and another basis function 149 for skylight. All the data over time, i.e., the appearance profiles 131, at each pixel 120 can be 'explained' by time offsetting the basis profile 100 and scaling the profile by some weight $w_{ij}$. The weights are stored in the sunlight image 145. An offset image $\Phi$ 171, with an offset for each pixel approximates the surface normal of the corresponding scene point. That is, the offset image 171 represents the geometry of the scene 102. We can also have a skylight offset image. However, for outdoor scenes, the skylight is low intensity and noisy, see FIG. 6. A skylight offset image may be appropriate for controlled indoor scenes.

Figure 6:
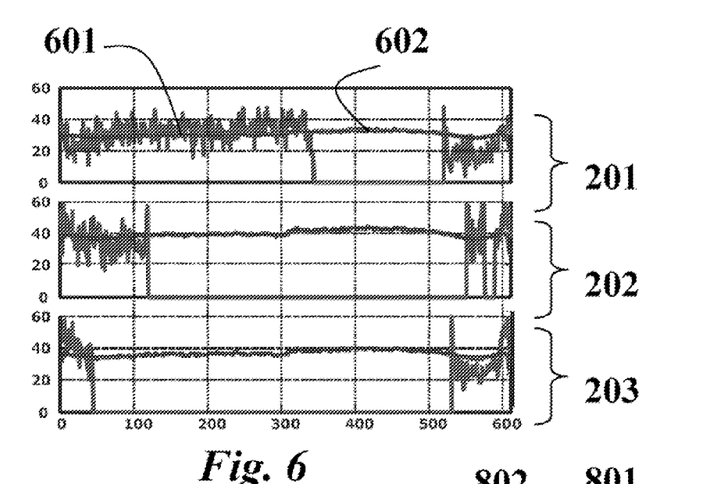
FIGS. 6, 7, and 8 are shadow, skylight and sunlight profiles according to an embodiment of the invention.
Figure 7:
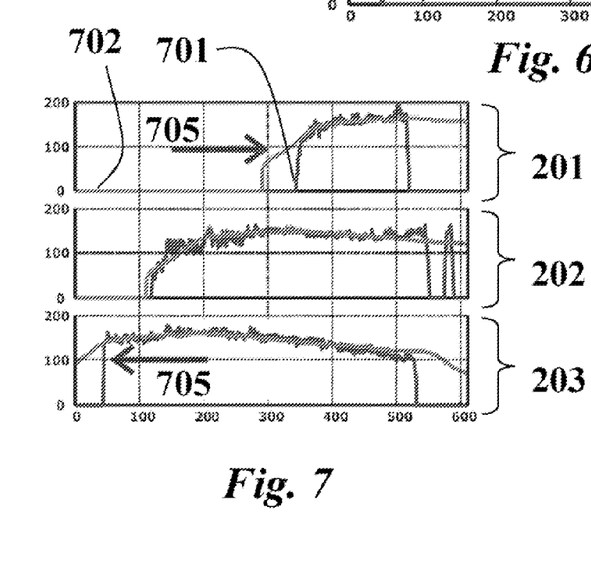
Figure 8:
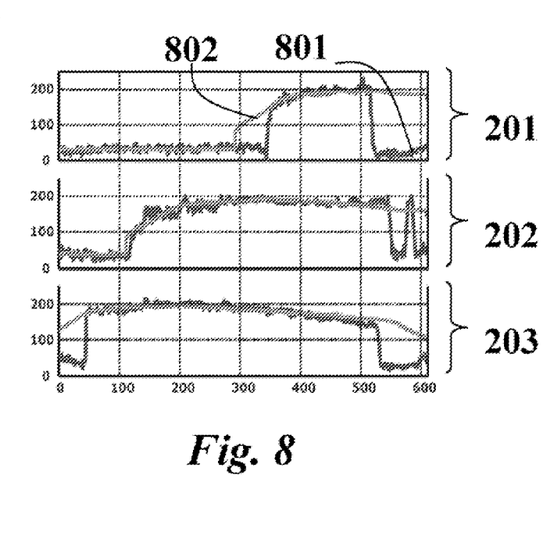

FIG. 6 shows the appearance profiles 601 when pixels, A, B, and C 201-203 are in a shadow, and the estimated skylight profiles 602. Note the decrease in the scale of the vertical intensity axis. FIG. 7 shows the appearance profiles 701 when pixels A, B, and C are in the sun, and the estimated sunlight profiles 702. The arrows 704 indicate a direction of the time offset of the basis profiles. FIG. 8 shows the original appearance profiles 801 and the sum of sunlight and skylight profiles 802.

Multiplying $F_i(t)$ by $S_i(t)$ yields the appearance profile of frames when the pixels are directly illuminated by the sun and atmospheric (sky) light as shown in FIG. 7. Based on our idea, we approximate $I_{sun}(t)$ with a matrix $H_{sun}(t)$ 148, modified by per-pixel weights $W_{sun}$ 145. In addition, we allow a per-pixel offset $\Phi$ 171 to the sunlight profile $$I_{sun,i}(t) \approx W_{sun,i} H_{sun}(t+\Phi_i). \quad (5)$$

We call the weight matrix $W_{sun}$ the sunlight or sunlight image 145, and $H_{sun}(t)$ the sunlight basis matrix 148. The weight matrix $W_{sun}(t)$ 145 is an estimate for the skylight image R(t) in Equation 4, up to the unknown scale factor $L_{sun}(t)$. In other words, the sunlight image represents the scene when directly illuminated. Multiplying the appearance profiles $F_i(t)$ shown in FIG. 3 by $(1-S_i(t))$ yields the appearance profile of pixels in shadows as shown in FIG. 6.

In order to estimate $I_{sky}(t)$ in Equation (4), we determine the single sunlight-vs.-time basis matrix $H_{sky}$ 146 for the entire image sequence 101, such that the appearance of any pixel $P_i$ can be represented as $$I_{sky,i}(t) \approx W_{sky,i} H_{sky}(t). \quad (6)$$

We call the matrix $W_{sky}$ of per-pixel weights the skylight image 145, and $H_{sky}(t)$ the skylight basis matrix 149. As stated above, we do not apply an offset to the skylight basis matrix in Equation (6) because the diffuse nature of skylight makes the offset hard to estimate. The skylight matrix can be offset for indoor scenes.

Factorizing Appearance Profiles

Our factorization is based on art alternating constrained least squares (ACLS) procedure to decompose the appearance profiles 131 into the W and H factors, see Lawrence et al. above. There, ACLS is applied to the problem of decomposing measured data into intuitively editable components. We adapt the ACLS procedure to our method for decomposing the appearance profiles 131. ACLS can also incorporate a confidence matrix C to deal with missing data. Setting an entry of the matrix C to zero causes the corresponding measurement to have no effect on the factorization. We use the matrix C to decompose the skylight and illumination components.

We apply ACLS in two separate steps to factor a matrix storing the measured spatio-temporal appearance profiles F(t) 131. First, we factor $I_{sky}(t) \approx W_{sky} H_{sky}(t)$. Then, we solve for the corresponding terms corresponding to the illumination profile $I_{sun}(t)$. More formally, each application of ACLS decomposes an m×n data matrix F(t) into a product of the n×k weight matrix W and a k×m is the basis matrix H(t), where m is the number of pixels in the image and n is the number of frames in the sequence 101. All decompositions are performed separately and identically on the three color channels of the data.

In order to adapt the conventional ACLS to handle the offsets necessary to implement Equation (5), we modify the iterative update stage of the procedure. Specifically, the conventional procedure according to Lawrence et al., alternates between phases in which H(t) is held fixed, while the matrix W is optimized using least squares, then vice versa. This is an instance of the principle of expectation maximization in inference.

In order to incorporate the offsets $\Phi_i$, we shift the entire matrix H(t) by $+\Phi_i$ when updating the matrix $W_i$ and, similarly, shift each row i of the matrix F(t) by $-\Phi_i$ during updates of the matrix H(t). Finally, we also use a third update phase during the iteration, in which we update the offsets $\Phi_i$ by determining, for each pixel, the offset that minimizes the Euclidean error between the linear combination of the basis matrices H(t) with $\Phi(t)$.

Figure 9:
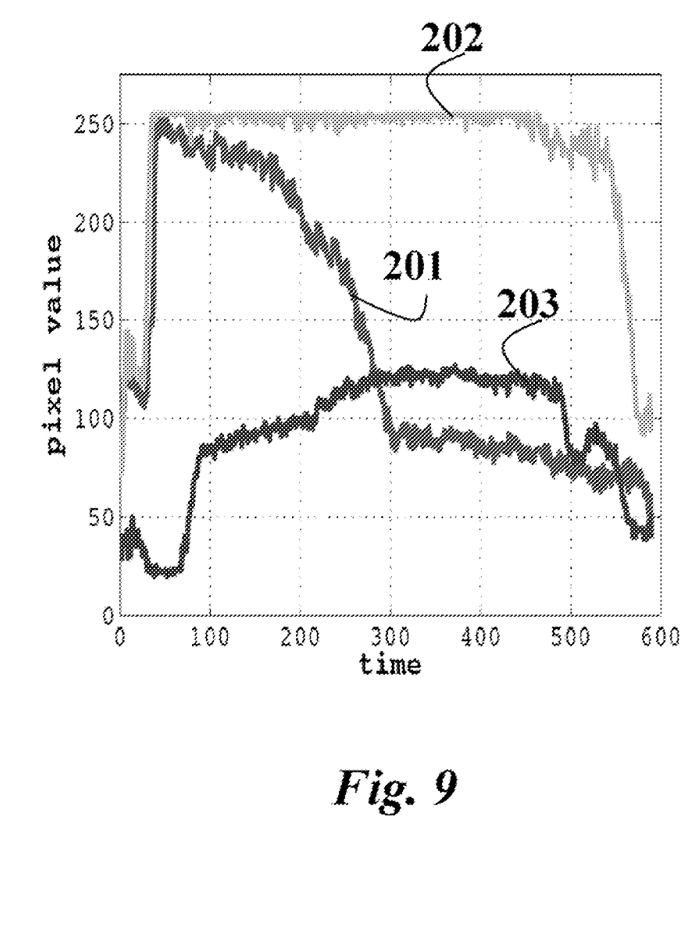
FIG. 9 is a schematic of appearance profiles.
Figure 10:
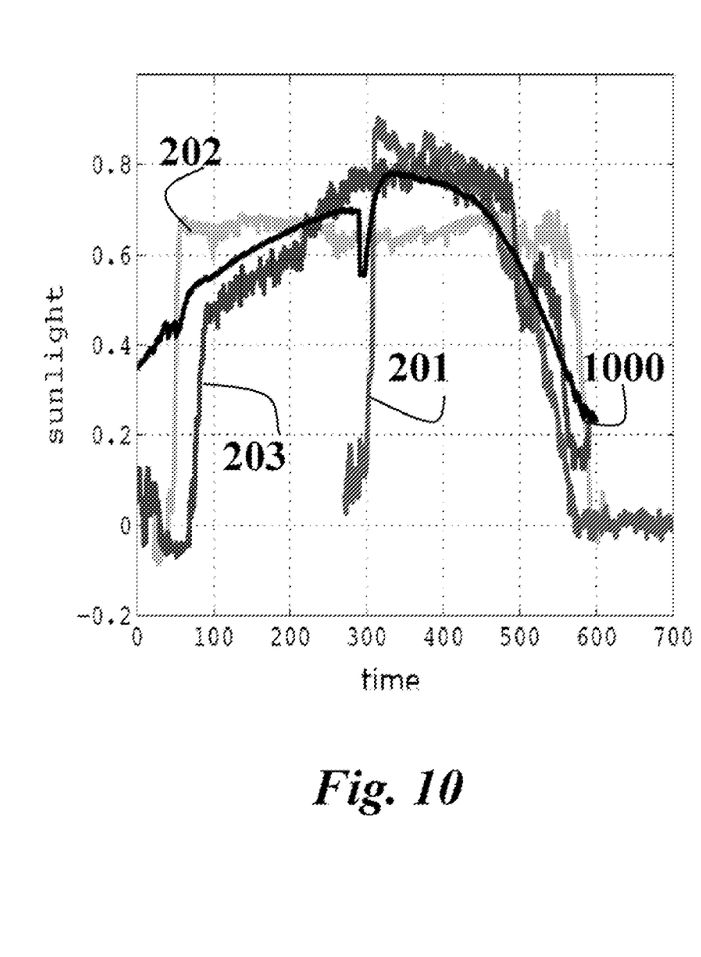
FIG. 10 is a schematic of scaled and weighted appearance profiles of FIG. 9, and a basis profile according to an embodiment of the invention.

FIG. 9 shows example appearance profiles 131 for pixels A, B, and C 201-203. FIG. 10 shows the corresponding aligned appearance profiles and estimated illumination profile 1000. The appearance profiles were aligned using the estimated offsets $\Phi_i$ and scaling weights for the pixels A, B, and C.

Skylight Images

In order to consider only shadowed pixels, we store $(1-S_i(t))$ row-wise in the confidence matrix C. This is a different strategy from using interpolation to fill in data for pixels under direct illumination, as we would need for factorization methods that do not consider confidence. However, because we have many frames in the sequence, the system of equations is highly over-constrained for a small number of basis profiles. Intuitively, if we are missing data at one pixel, then we probably observe the data at another pixel with a similar normal (offset) and appearance profile.

FIG. 10 shows the skylight basis profile, and its fit to the appearance profiles. FIG. 11B shows skylight image $W_{sky}$, i.e., no sunlight FIG. 11C shows a reconstructed sunlight image $I_{sky}(t)$, i.e., no skylight. The lighting is related to both surface albedo and ambient occlusion, where the ambient term for a pixel on a surface is determined by how occluded that pixel is by other surfaces in the scene, i.e., the darker the pixel, the less skylight the pixel receives or reflects.

Sunlight Images

The skylight images $I_{sky}(t)$ are subtracted from the original images F(t) to form the sunlight images $I_{sun}(t)$. We store the matrix $S_i(t)$ row-wise in the confidence matrix C. Thus, we only consider pixels that are not in shadow during the factorization.

We apply ACLS to find the basis matrix $H_{sun}$, the sunlight image $W_{sun}$, and the offsets $\Phi_i$. The initialization of the offsets $\Phi_i$ enables the ACLS to convergence. We typically use random values in the range [−(n/2),+(n/2)], although different ranges are also possible.

FIG. 7 shows the sunlight basis matrix $H_{sun}(t)$ and its fit to the input data. FIG. 11B shows the skylight image $I_{sky}$. FIG. 11C shows a reconstructed sunlight image $I_{sun}(t)$ without the skylight component. The harsh black shadows in the reconstructed image $I_{sun}(t)$ are similar to images taken on extraterrestrial bodies lacking light scattering, such as the moon and mars.

Reconstruction Quality

Interestingly, our shadow estimation picks up the shadows of moving objects. In some cases, we can filter the shadow images S(t) in the temporal domain to remove flickering of spurious shadows. As described above, we can remove these motion artifacts with a suitable computer vision background model. This effectively removes the "ghost" shadows of moving objects.

Compression

Our method is a very efficient representation for a lengthy image sequence. We store the sunlight, skylight and offset images using high-quality JPEG compression. The binary shadow profiles are stored per pixel using interval encoding and Lempel-Ziv-Welch (LZW) compression. The basis matrices can be stored in conventional files. The compression efficiency, depending on a complexity of the scale can range from three or more orders of magnitude.

Editing and NPR

As an advantage, our method factors the scene 102 into physically meaningful components 141-143. Each component can be edited to generate interesting effects. We can edit the offset image 171 to affect the appearance of surfaces by changing their pseudo-normals, see FIG. 11D. Edits to the sunlight image and sunlight profile have an effect on surface reflectance. We can also selectively remove shadows, for example, for buildings in the background. Note that by simply editing only the three sunlight, skylight and offset images, we can affect the entire reconstructed image sequence 151.

We can also generate non-photorealistic (NPR) effects, and stylized images and videos. First, we transform the offset image $\Phi$ to pseudo-normals by mapping offsets to angles along the arc 105 that corresponding to the movement of the direct light source 104. In order to increase the plausibility of the normals, we apply a small offset to the normals based on a ratio between the sunlight and skylight images, reasoning that vertical surfaces generally receive less direct illumination than do horizontal surfaces. While these normals are certainly not accurate, we nevertheless expect that they are related to the true normals by some continuous function. The normals are sufficient as input to rendering techniques such as exaggerated shading, which seek to emphasize local differences between normals. We generate our final NPR results by compositing the exaggerated shading with the sun and sky color maps, as well as optionally the shadow images. Note that the process is temporally coherent over time, leading to smooth video results.

Effect of the Invention

Figure 11A:
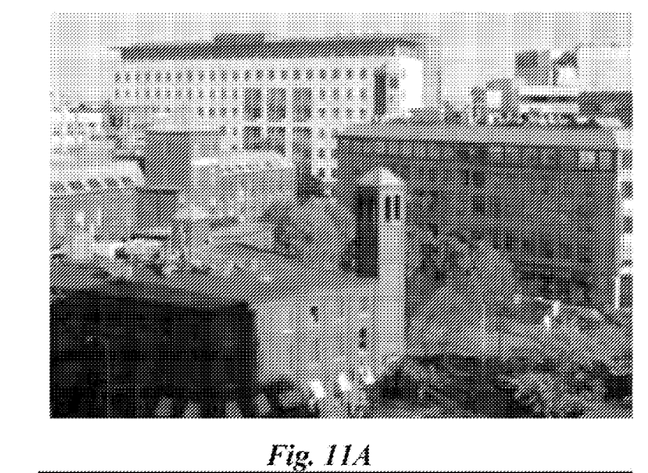
FIGS. 11A-11D are images processed according to the embodiments of the invention.
Figure 11B:
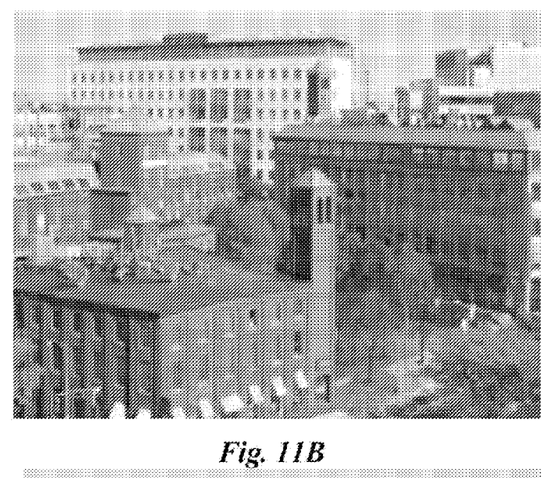
Figure 11C:
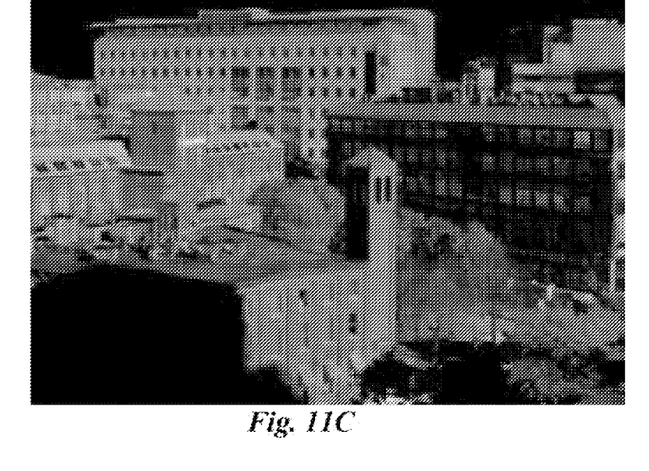
Figure 11D:
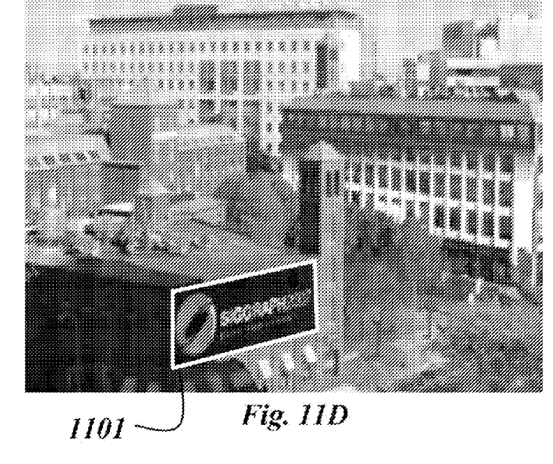

FIGS. 11A-11D are images processed according to the embodiment of the invention. FIG. 11A is an input image, FIG. 11B a reconstructed image without shadows. FIG. 11C a reconstructed image illuminated only with direct sunlight, and lacking atmospheric skylight. Note the 'moon-like' appearance. FIG. 11D is an image with modified to include an artificial sign board 1101.

The scene components according to the embodiments of our invention are compact, intuitive, factored representation for sequences of images, which separate spatially varying aspects from temporal variation. The representations enable a number of novel applications, such as shadow removal, relighting, advanced image editing, and painterly rendering.

Moving objects show up as residue between the original and reconstructed image sequences. Moving objects can be removed from the input video 101 using conventional dynamic object tracking and segmentation procedures, and then added back into the reconstructed sequence 151.

Although the invention has been described by way of examples of preferred embodiments, it is to be understood that various other adaptations and modifications can be made within the spirit and scope of the invention. The specification and drawings are, accordingly, to be regarded in an illustrative rather than a restrictive sense. Therefore, it is the object of the appended claims to cover all such variations and modifications as come within the true spirit and scope of the invention.

We claim:

1. A method for factorizing a sequence of images acquired of a scene into lighting components, in which the scene is illuminated by a moving light source, comprising:
   constructing, an appearance profile for each pixel in the sequence of images, in which the appearance profile is a vector representing intensities of the pixel at instances in time; and
   factorizing the appearance profiles into a shadow component, a skylight component, and a sunlight component.

2. The method of claim 1, in which the factorizing further comprising:
   generating, from the appearance profile for each pixel, a corresponding shadow profile, in which the shadow profile indicates whether the pixel is in a shadow or not at the instances in time, and the shadow profiles represent the shadow component;
   generating, from the appearance profiles, a sunlight image in a form of sunlight weights and an offset image, and for each pixel a set of sunlight basis matrices at the instances in time, to represent the sunlight component; and
   generating, from the appearance profiles, a skylight image in a form of skylight weights, and for each pixel a set of skylight basis matrices at the instances in time, to represent the skylight component.

3. The method of claim 1, in which the scene is outdoors, and the moving light source is the sun.

4. The method of claim 1, in which the sequence of images is a time-lapse video.

5. The method of claim 1, in which the scene is indoors.

6. The method of claim 1, in which each pixel has three color channels, and constructing and factorizing is performed independently and identically for each color channel.

7. The method of claim 1, further comprising:
combining the shadow component, the skylight component, and the sunlight component to produce a reconstructed video.

8. The method of claim 7, further comprising:
editing the shadow component, the skylight component, and the sunlight component before the combining.

9. The method of claim 1, in which each shadow profile has one bit for each image in the sequence to indicate whether the pixel is in a shadow or not at the instances in time.

10. The method of claim 2, in which the shadow profiles form a sequence of binary shadow images.

11. The method of claim 10, further comprising:
applying an edge-preserving bi-lateral filter to sequence of shadow images.

12. The method of claim 10, further comprising:
removing moving objects from the sequence of shadow images.

13. The method of claim 2, in which each pixel in the offset image approximate a surface normal in the scene.

14. The method of claim 13, in which the surface normals represent geometry of the scene.

15. The method of claim 2, in which the factorizing uses an alternating constrained least squares procedure to decompose the appearance profiles into the sets of matrices.

* * * * *